United States Patent [19]

Doornbos et al.

[11] Patent Number: 4,701,335

[45] Date of Patent: Oct. 20, 1987

[54] BUTTER-LIKE CONCENTRATE

[75] Inventors: Tamme Doornbos, Rotterdam; Arnoldus van der Heijden, 's-Gravenzande; Johannes W. van der Kamp, Nieuwerkerk a/d IJssel, all of Netherlands; Johannes F. de Rooij, Sellindge, United Kingdom

[73] Assignee: Lever Brothers Company, New York, N.Y.

[21] Appl. No.: 832,108

[22] Filed: Feb. 21, 1986

Related U.S. Application Data

[63] Continuation-in-part of Ser. No. 768,305, Aug. 22, 1985, abandoned.

[30] Foreign Application Priority Data

Aug. 24, 1984 [GB] United Kingdom ............... 8421535
Feb. 7, 1985 [NL] Netherlands .................. 8500336

[51] Int. Cl.$^4$ ................. A21D 10/00; A23L 1/226
[52] U.S. Cl. .................. 426/533; 426/549; 426/613
[58] Field of Search ........... 426/533, 580, 581, 585, 426/586, 613, 549

[56] References Cited

U.S. PATENT DOCUMENTS

| | | | |
|---|---|---|---|
| 2,527,785 | 10/1950 | Armstrong | 426/533 |
| 3,126,283 | 3/1964 | Noznick et al. | |
| 3,130,204 | 4/1964 | Tate et al. | |
| 3,519,437 | 7/1970 | Giacino | 426/533 |
| 3,663,236 | 5/1972 | Holloway | 426/533 X |
| 3,780,184 | 12/1973 | Broderick et al. | 426/533 |
| 4,346,121 | 8/1982 | Turos | 426/586 X |
| 4,347,258 | 8/1982 | Merkenich et al. | 426/586 X |

FOREIGN PATENT DOCUMENTS 2731904 1/1978 Fed. Rep. of Germany ...... 426/533
555143 10/1974 Switzerland .

OTHER PUBLICATIONS

"Food Technology", vol. 29, No. 5, May 1975, pp. 82–98, J. E. Kinsella, Butter Flavor.

Primary Examiner—Robert Yoncoskie
Attorney, Agent, or Firm—Milton L. Honig; James J. Farrell

[57] ABSTRACT

A butter-like concentrate is provided, which concentrate is a mildly heated mixture of 25–98% (w/w) of an oil or fat preferably containing butterfat, 2–74% (w/w) of protein and carbohydrate taken together, and 0–20% (w/w) conventional adjuvants.

Preferably the fat contains at least 25% (w/w) butterfat and the ratio of protein to carbohydrate is between 3:1 and 1:3. The butter-like concentrate is heated mildly so that it contains 5-hydroxymethyl-furfural and maltol at levels which increase considerably upon further heating to 135° C. for 10 minutes in a closed vessel.

7 Claims, No Drawings

BUTTER-LIKE CONCENTRATE

CROSS-REFERENCE

This application is a continuation-in-part of our earlier co-pending application, Ser. No. 768,305, filed Aug. 22nd 1985, now abandoned.

BACKGROUND OF THE INVENTION

The invention relates to butter-like concentrates and to bakery products containing such concentrates. Under bakery products are here to be understood ingredients for baking like margarines and shortenings, as well as baked products like pastries, biscuits, croissants, gateaux etc. Also other confectioners' products like e.g. candy, caramels etc. are included.

Different compositions usually having a meat-like flavour are well known in the art. mostly these are prepared by heating a mixture comprising a sugar, an amino acid, crystein and/or nucleotides.

It is known from U.S. Pat. No. 3,126,283 (Beatrice Foods Co.) to prepare a sweetened condensed product, inter alia for bakery purposes, by heating to about 90° C. a mixture consisting of about 21% skimmed milk powder, 30% water, 8% fat and 40% of saccharose. The product obtained resembles sweetened condensed milk in flavour and in appearance and has high contents of water and carbohydrates (saccharose) in about 40% (w/w). Moreover, the product disclosed contains about 21% (w/w) of skimmed milk powder (dry milk solids non fat) which corresponds to about 7% of protein and 10% lactose. Consequently, the ratio of protein to carbohydrate is about 7:(40+10), i.e. about 1:7. Also the fat content is low. The product is stated to be useful, inter alia for coffee in place of cream or milk, for infant feeding, for baking and for candy making.

SUMMARY OF THE INVENTION

It has now been found that an excellent sweet, butter-like concentrate can be obtained by mildly heating a mixture of fat (preferably containing butterfat), protein (preferably whey protein), a carbohydrate (preferably a reducing sugar) and water in certain weight ratios and under certain conditions. It is desirable that the amount of fat is at least 25, rather at least 50% w/w and the amount of water initially between 1 and 20%, preferably between 3 and 15%. Consequently, the butter-like concentrate comprises a heated mixture of 25-98% w/w of fat containing butterfat, 2-74% w/w protein and carbohydrate taken together, and 0-20% of conventional adjuvants. Conventional adjuvants are e.g. water, emulsifiers, electrolytes, flavours, etc. Furthermore, the weight ratio of protein to carbohydrate is usually between 3:1 and 1:3, but preferably between 2:1 and 1:2. Preferably the amount of protein and carbohydrate taken together is between 4 and 40% (w/w).

DETAILED DESCRIPTION OF THE INVENTION

The presence of an emulsifier such as lecithin in an amount between 0.5 and 2% is desirable. The pH of the mixture before heating is normally between 5.0 and 8.0. Heating is carried out under mild conditions (typically half an hour at 100° C., but temperatures between 70° and 140° C. can be used for periods of 10 minutes to several hours (the shorter periods for higher temperatures). Water should preferably remain present when preparing this reaction concentrate and the conditions of temperature and reaction time are chosen in such a way that a substantial amount of precursors of compounds typical for baked butter are obtained, so that these precursors can be converted into actual baked butter-like flavour compounds upon further heating under e.g. baking conditions.

In the butter-like concentrate the concentration of intermediate compounds, such as glycosylamines and Amadori rearranged products etc. is preferably relatively high, the amount of flavour compounds like maltols, furanones and furfurals is still relatively low. Upon further heating, thse amounts increase. In particular, the amount of 5-hydroxymethyl-furfural increases upon subsequent heating of the butter-like concentrate to 135° C. for 10 minutes in a closed system in such a way that, after the subsequent heating, at least a six-fold quantity is present. Also the amounts of maltols increase.

Preferably at least a ten-fold quantity of 5-hydroxymethyl-furfural is formed. 5-Hydroxymethylfurfural is especially formed when hexoses are used as the starting material, whereas furfural is predominantly formed when pentoses are used. The amounts of maltols increase less rapidly than 5-hydroxymethyl-furfural, but, after subsequent heating at 135° C. for 10 minutes, at least a two-fold quantity (often at least a three-fold quantity) has been observed.

The butter-like concentrate so obtained is a yellowish to brownish fatty paste at room temperature which is stable upon storage.

An advantage of using a butter-like concentrate according to the present invention instead of adding a butter flavour to the bakery products, is that when adding the butter-like concentrate the flavour is being developed, instead of being partially lost during baking. Another major advantage of this butter-like concentrate is that it is made from ingredients normally used in bakery products using processes which fall under the scope of the proposed EEC definition for natural flavouring materials.

The butter-like concentrate according to the present invention is therefore used with advantage in bakery products such as bakery margarines, bakery fats, shortenings, improved flour, cake mixes, baking aids and premixes, doughs (e.g. deep frozen) etc. and imparts upon actual baking an excellent sweet, butter-like impression.

One embodiment of the present invention is therefore the butter-like concentrate and its preparation, whereas other embodiments of the invention are bakery products such as bakery ingredients, as well as actually baked products, other confectioners' products and their preparation. As to the amount of butter-like concentrate used in bakery products, it is of course the amount of butter-like concentrate in the baked product or confectionery product which counts and this amount is from 50 to 20,000 ppm (1:10 $^6$), preferably between 500 and 10,000 ppm (excluding water).

In bakery ingredients such as margarine, especially bakers' margarine, the concentration is correspondingly higher, usually between 0.5 and 100 parts per thousand, preferably between 1 and 50 parts per thousand.

The starting materials of the butter-like concentrate are oils and preferably low-melting fats containing preferably at least 25%, rather at least 50%, butterfat. Also hydrogenated oils like soyabean oil, palm oil, palmkernel oil, coconut oil etc. are suitable especially in addition to butterfat.

As protein material, milk protein is preferred, in particular whey protein, skimmed milk powder etc. Casein alone is less suitable. The protein is preferably spray-dried, demineralized and not denatured. The carbohydrate employed can be a monosaccharide or a disaccharide. e.g. glucose, lactose, maltose and galactose. Monosaccharides are preferred, hexoses and pentoses in particular. These ingredients sometimes contain enough water to prepare the concentrate, so that adding water is not always necessary.

It is preferred to employ an emulsifier, and lecithin or mono/diglycerides are such conventional adjuvants which are suitable for this purpose. It is preferred to use 1–20% of water. Sometimes it is advantageous to add electrolyte, e.g. phosphate, to speed up the formation of flavour precursors.

The butter-like concentrate according to the present invention is a turbid paste having a Gardner colour (1963) estimated between 12 and 20, preferably between 15 and 18. Another method to characterize colour is Hunterlab, which yielded the following parameters: $L=50$, $a/b=0.4$, $(a^2+b^2)^{\frac{1}{2}}=20$.

This paste an be easily worked into the fatty phase of a margarine, shortening etc. in the amounts specified above. Known flavouring ingredients like diacetyl, lower lactones etc. may also be added.

Sometimes it is advantageous to work up the product in a colloid mill or a knife mill. For certain applications it is recommended that the solids be removed, e.g. by filtration.

By using standard recipes, it is possible to prepare baked products with an improved butter-like impression if one uses the butter-like concentrate according to the present invention.

EXAMPLE 1

142.4 kg butterfat were melted in a reaction vessel, 1.6 kg mono/diglycerides 27 kg undenatured whey protein concentrate (containing 78% protein, 4% lactose and 5.5% water obtained by ultrafiltration and spray-drying, and 27 kg anhydrous glucose were added, followed by 10 kg demineralized water.

The temperature was then increased to 98°–100° C. in 20 minutes and the mixture kept at this temperature for 30 minutes. Volatiles were refluxed. The mixture was then cooled to 50° C. and taken to a colloid mill at 47° C. and subsequently milled in a knife mill at 65°–70° C. The product obtained was a yellowish/brownish paste containing about 7% of water. Fat-free dry solids about 24%. The amount of residual free carbohydrate was 10%, Gardner colour 16, Hunterlab parameters: $L=47$, $a=9$, $b=20$.

The butter-like concentrate so obtained had a sweet flavour slightly reminiscent of butter, but upon further heating at higher temperatures, i.e. baking temperatures, a pronounced sweet, baked butter-like flavour developed. This yellowish/brownish paste consequently contained an appreciable amount of precursors of the sweet, butter-like flavour, as is evidenced by the fact that upon further heating to 135° C. for 10 minutes in a closed system, further amounts of especially 5-hydroxymethyl-furfural were formed. Also further amounts of maltols were formed.

By degassing the concentrate as such and also after heating as described above, using a technique described in J.A.O.C.S. 38 (1961), 40–44, the volatiles were collected and subsequently analysed by gas chromatography and mass spectrometry. It was established that a 28.3-fold quantity of 5-hydroxymethyl-furfural, a 3.1-fold quantity of maltol and a 3.3-fold quantity of hydroxy-maltol were present.

EXAMPLE 2

200 kg butterfat were melted by heating in an open vessel, 2.5 kg lecithin were dissolved, 50 kg demineralized water, 40 kg undenatured whey protein (as described in Example 1), and 40 kg anhydrous glucose were added and the mixture was heated to a temperature of 130°–140° C.

Volatiles were allowed to escape until a product with a crumb-like structure was obtained (about 30 minutes). This product was milled after cooling to 50° C. and, under stirring, worked into a brownish paste-like product, Gardner colour 18, having a moisture content of slightly below 9%. The amount of residual free carbohydrate was 9%. Upon further heating a baked butter-like flavour was obtained. The amount of 5-hydroxymethyl-furfural had increased to the 34.9-fold amount.

EXAMPLE 3

40 kg butterfat and 100 kg partially hydrogenated coconut oil (m.p. 31° C.) were mixed and melted in a reaction vessel, 1.65 kg mono/diglycerides, 30 kg sweet buttermilk powder (35% protein, 42% lactose, 3% water) and 5 kg arabinose were added, followed by 8 kg demineralized water.

The temperature was then increased to 88°–90° C. in 15 minutes and the reaction mixture kept at this temperature for 15 minutes. Volatiles were refluxed. The reaction mixture was then cooled to 50° C. and worked up as described in Example 1.

The concentrate obtained had a fairly sweet flavour with slight coconut-like impressions, but upon further heating at higher temperatures, i.e. baking temperatures, a pronounced, sweet, baked butter-like flavour developed.

The furfural content was found to increase by a factor 10.2 when an additional heat treatment in a closed system at 135° C. for 10 minutes was carried out.

EXAMPLE 4

75 kg butterfat and 70 kg partially hydrogenated coconut oil (m.p. 31° C.) were melted and mixed in a reaction vessel.

1.5 kg mono/diglycerides, 35 kg butter serum concentrate containing 39% protein, 13% lactose and 5% water (ex Corman, Belgium) and 20 kg anhydrous galactose were added, followed by 6 kg demineralized water.

The temperature was then increased to 98°–100° C. in 18 minutes and the reaction mixture kept as this temperature for 25 minutes. Volatiles were refluxed. The reaction mixture was cooled to 50° C. and worked up as described in Example 1.

The butter-like concentrate obtained had a sweet, dairy flavour, which upon further heating at higher temperatures, i.e. baking temperatures, developed a pronounced sweet, butter-like flavour.

The 5-hydroxymethyl-furfural content was found to increase 19.8-fold when the concentrate was further heat-treated in a closed system at 135° C. for 10 minutes.

EXAMPLE 5

A bakery margarine for sweet biscuits was prepared over a Votator (a scraped-surface heat exchanger) from an aqueous phase 17% (w/w) consisting of:

93% demineralized water
3% modified starch
3.5% saccharose
0.25% citric acid
0.25% potassium sorbate.

To the margarine were added:
8 ppm diacetyl
6000 ppm of butter-like concentrate of Example 1 and a fat phase (83% w/w) consisting of about:
50% palm kernel oil
10% hardened fish oil (m.p. 37°)
10% rape seed oil (low in erucic acid)
30% soyabean oil
0.2% mono/diglyceride
0.1% lecithin.

EXAMPLE 6

A bakery margarine for croissants (or a so-called Danish pastry margarine) was prepared over a Votator from an aqueous phase (17% w/w) consisting of:

86% demineralized water
2.4% modified starch
5.5% salt
5.5% saccharose
0.4% citric acid
0.2% potassium sorbate.

To the margarine were added:
8 ppm diacetyl
6750 ppm butter-like concentrate of Example 2, and a fat phase (83% w/w) consisting of:
40% hardened palmoil (m.p. 42° C.)
30% hardened rapeseed oil (m.p. 32° C.)
15% soyabean oil
15% lard.

EXAMPLE 7

Croissants were prepared from a dough of the following composition:
1000 g flour
40 g bakers yeast
25 g salt
100 g saccharose
300 g demineralized water.
300 g milk.

The dough was kneaded. After this had been done, it was put into a tin and covered in order to prevent crusting. For fermenting, the dough was kept at room temperature for one hour. Then the dough was broken and put into a refrigerator and kept there overnight. The dough was then cut into pieces. For turning the dough, a piece was spread out in a rectangle and half of it was covered with the margarine (in total 500 g of the pastry margarine of Example 6) which previously has been tempered. Then the spread dough was folded in two, covering the margarine and joining the edges. It was then given a turn, folded in three and thereafter a turn folded in four (that means a simple turn and a double turn). The dough was rolled to a thickness of about 3 mm.

For shaping, the dough was cut into strips of 20 cm width and divided into triangles of 40 to 50 g of dough. The croissants were cut in very lengthened triangles having a height of from 18 to 20 cm and a base of 9 to 10 cm. They were then rolled up several times around themselves.

For further fermentation, the croissants were allowed to rise under the shelter of the draught or in a prover between 30° and 35° C. Baking was carried out briskly (at about 250° C.) without any damp for about twelve minutes. The croissants were washed twice with eggs, once before the last fermentation.

In the same way, blank croissants, i.e. without butter-like concentrate, were baked and the two types were compared as to butter-like smell and butter-like taste by a panel consisting of 105 experienced members. The outcome was that 30 persons indicated no preference, 15 persons preferred the control (blank) while 60 persons indicated a more butter-like croissant for the product containing the butter-like concentrate, which is a statistically significant result (alpha=0.01%).

EXAMPLE 8

Sweet biscuits were prepared from a mixture consisting of 500 parts of margarine, 300 parts of saccharose, 800 parts of flour, 50 parts of eggs, 20 parts of skimmed milk powder, 10 parts of baking powder and 5 parts of salt.

Two kinds of margarine were used, one with butter-like concentrate of Example 5, and one without this concentrate. After baking (baking temp. 170° C., baking time 20 min.), the two kinds of sweet biscuits obtained were assessed by 74 panel members. The smell, as well as the taste, of the sweet biscuits was judged separately. The results are as follows:

With regard to the smell, 53% preferred the sweet biscuit containing the butter-like concentrate, 19% preferred the sweet biscuits without the concentrate and 28% indicated no preference. With regard to the taste, 51% preferred sweet biscuits with the butter-like concentrate, 18% preferred the other product and 31% indicated no preference.

EXAMPLE 9

In a heavy based saucepan, 360 g saccharose, 270 g glucose, 560 g skimmed milk and 1.5 g salt were stirred under heating until the contents of the pan were well mixed. Subsequently, the pan and its contents were warmed until boiling, after which 160 g of vegetable fat (substantially palmkernel oil) was added and mixed for about 5 minutes. The contents of the pan was then split into two halves. Each mixture was raised in temperature under the same stirring conditions to 119° C. in the same time. To one heated mixture, 2.5 g of the butter-like concentrate as prepared in Example 1 was added, while the other mixture was considered as the control sample. The temperature of the contents of both mixtures was raised to 121° C. within 2 to 3 minutes. Both mixtures were separately added to cooled slabs of this material. After cooling, toffees were cut into equal cubes and wrapped in waxed paper. The toffees containing the butter-like concentrate were found to have an excellent flavour.

EXAMPLE 10

600 kg butterfat were melted in a reaction vessel equipped with a water-cooled condenser, together with 4.9 kg partially hydrolyzed soya lecithin (degree of hydrolysis of 45%)
6.2 kg undenatured whey concentrate (containing 78% protein, 4% lactose and 5.5% water) obtained by ultrafiltration and spray-drying, and
6.2 kg anhydrous glucose, followed by
2.8 kg demineralized water.

The temperature was then increased to 108°–110° C. in 20 minutes and the mixture kept at this temperature for 15 minutes. Volatiles were refluxed. The mixture was then cooled to 60° C. and filtered to remove the solids. The concentrate so obtained had a sweet, butter-like flavour.

EXAMPLE 11

600 kg butterfat were melted in a reaction vessel equipped with a water-cooled condenser, together with
5.3 kg partially hydrolyzed soya lecithin (degree of hydrolysis of 45%)
22.4 kg undenatured whey concentrate (containing 78% protein, 4% lactose and 5.5% water) obtained by ultrafiltration and spray-drying, and
22.4 kg anhydrous glucose, followed by
8.6 kg demineralized water.

The temperature was then increased to 108°–110° C. in 18 minutes and the mixture kept at this temperature for 20 minutes. Volatiles were refluxed. The mixture was then cooled to 60° C. and taken to a colloid mill and subsequently milled in a knife mill at 65°–70° C. The brownish paste-like product developed a pronounced baked butter-like flavour upon further heating to 135° C.

EXAMPLE 12

A bakery margarine for croissants (or so-called Danish pastry margarine) was prepared over a scraped-surface heat exchanger (Votator) from an aqueous phase (17% w/w consisting of:
84% demineralized water
2.4% modified starch
5.5% salt
5.5% saccharose
0.4% citric acid
0.2% potassium sorbate.
To the margarine were added:
8 ppm diacetyl
6750 ppm butter-like concentrate of Example 2, and a fat phase (83% w/w) consisting of:
40% hardened palm oil (m.p. 42° C.)
30% hardened rapeseed oil (m.p. 32° C.)
15% soyabean oil
15% lard.

EXAMPLE 13

Croissants were prepared from a dough of the following composition:
1000 g flour
40 g bakers yeast
25 g salt
100 g saccharose
300 g demineralized water
300 g milk.

The dough was kneaded. After this had been done, it was put into a tin and covered to prevent crusting. For fermenting, the dough was kept at room temperature for one hour. Then the dough was broken and put into a refrigerator and kept there overnight. The dough was then cut into pieces. For turning the dough, a piece was spread out in a rectangle and half of it was covered with the margarine (in total 500 g of the pastry margarine of Example 12) which previously had been tempered.

Then the spread dough was folded in two, covering the margarine and joining the edges. It was then given a turn, folded in four (that means a simple turn and a double turn). The dough was rolled to a thickness of about 3 mm.

For shaping, the dough was cut into strips of 20 cm width and divided into triangles of 40 to 50 g of dough. The croissants were cut in very lengthened triangles having a height of 18 to 20 cm and a base of 9 to 10 cm. They were then rolled up several times around themselves.

For further fermentation, the croissants were allowed to rise under the shelter of the draught or in a prover between 30° and 35° C. Baking was carried out briskly (at about 250° C.) without any damp for about twelve minutes. The croissants were washed twice with eggs, once before the last fermentation.

In the same way, blank croissants, i.e. without butter-like concentrate, were baked and the two types were compared as to butter-like smell and butter-like taste by a panel consisting of 25 experienced members. The outcome was that 2 persons indicated no preference. Two tasters preferred the blank croissants, while 21 persons indicated a more butter-like croissant for the product containing the butter-like concentrate.

We claim:

1. A butter-like concentrate prepared by a process comprising heating a mixture between 70° and 140° C. for at least 10 minutes, said mixture comprising:
   25–98% (w/w) of an oil or fat containing at least 25% butterfat; and
   2–74% of milk protein and a saccharide chosen from monosaccharide, disaccharide, and mixtures thereof,
   the weight ratio of protein to saccharide ranging from 3:1 to 1:3;
   said concentrate, when incorporated with bakery ingredients to produce bakery products, will as a result of baking release a butter flavor.

2. A concentrate according to claim 1, wherein the weight ratio of protein to saccharide is between 2:1 and 1:2.

3. A concentrate according to claim 1, wherein the saccharide comprises a monosaccharide.

4. A concentrate according to claim 1, wherein the non-fat solids have been removed from said concentrate.

5. A concentrate according to claim 1 wherein upon subsequent heating of the concentrate to 135° C. for 10 minutes in a closed system there is produced at least a six-fold amount of 5-hydroxymethyl-furfural.

6. A concentrate according to claim 1 wherein upon subsequent heating of the concentrate to 135° C. for 10 minutes in a closed system there is produced at least a two-fold amount of maltol.

7. Bakery products comprising a butter-like concentrate according to claim 1.

* * * * *